United States Patent
Becker et al.

(10) Patent No.: US 8,103,214 B2
(45) Date of Patent: Jan. 24, 2012

(54) SYSTEM AND METHOD FOR ADAPTING A LOOP POWERED FIELD INSTRUMENT FOR USE IN A WIRELESS NETWORK

(75) Inventors: Jeff Becker, Scottsdale, AZ (US); Raymond A. Rogowski, II, Fort Washington, PA (US)

(73) Assignee: Honeywell International Inc., Morristown, NJ (US)

( * ) Notice: Subject to any disclaimer, the term of this patent is extended or adjusted under 35 U.S.C. 154(b) by 782 days.

(21) Appl. No.: 12/098,728

(22) Filed: Apr. 7, 2008

(65) Prior Publication Data
US 2009/0253383 A1    Oct. 8, 2009

(51) Int. Cl.
*H04B 7/00* (2006.01)
(52) U.S. Cl. .................................. 455/41.2; 455/41.3
(58) Field of Classification Search .............. 455/41.1, 455/41.2, 41.3, 74, 74.1, 522
See application file for complete search history.

(56) References Cited

U.S. PATENT DOCUMENTS

| | | | |
|---|---|---|---|
| 5,682,476 A | 10/1997 | Tapperson et al. | |
| 5,936,514 A | 8/1999 | Anderson et al. | |
| 6,963,817 B2 | 11/2005 | Ito et al. | |
| 7,262,693 B2 | 8/2007 | Karschnia et al. | |
| 7,330,695 B2 | 2/2008 | Karschnia et al. | |
| 7,756,475 B2 * | 7/2010 | Rambo | 455/41.2 |
| 7,853,221 B2 * | 12/2010 | Rodriguez et al. | 455/74 |
| 2006/0089106 A1 * | 4/2006 | Chen | 455/74.1 |
| 2006/0265105 A1 * | 11/2006 | Hughes | 700/282 |

* cited by examiner

*Primary Examiner* — Tuan H Nguyen

(57) ABSTRACT

A system and method are disclosed for adapting a loop powered wired field instrument for use in a wireless network of wireless field instruments without changing internal wiring of the loop powered wired field instrument. The invention comprises a wired to wireless adapter apparatus that connects to a wired field instrument. The apparatus comprises power conversion circuitry that receives either external power or battery power and converts the received power to loop power for the wired field instrument. The apparatus also receives and decodes a wired signal from the wired field instrument and converts the decoded signal for subsequent wireless transmission to a wireless network. It appears to the wireless network that receives the transmitted wireless signal that the wired field instrument is a wireless field instrument.

20 Claims, 4 Drawing Sheets

SYSTEM AND METHOD FOR ADAPTING A LOOP POWERED FIELD INSTRUMENT FOR USE IN A WIRELESS NETWORK

TECHNICAL FIELD OF THE INVENTION

The present invention is directed, in general, to control systems for process facilities and, more specifically, to a system and method for adapting a loop powered field instrument for use in a wireless network.

BACKGROUND OF THE INVENTION

In the process control industry, process facilities (e.g., a manufacturing plant or crude oil refinery, etc.) may be managed using distributed control systems. Contemporary control systems include numerous models tailored to control or monitor various associated processes of the facility. Conventional means link these modules together to produce the distributed nature of the control system. This affords increased performance and a capability to expand or reduce the control system to satisfy changing facility needs.

Field instruments may be used to obtain sensor readings or measurements of a particular characteristic (e.g., temperature, pressure, flow, sound, light) that is needed in the control system. Many prior art field instruments are configured as wired field instruments. This means that the field instrument is connected to the control system by conventional wiring. A wired field instrument sends sensor information to the control system over a conventional wired interface (e.g., a two wire twisted pair current loop).

As wireless technology has continued to become more available, wireless field instruments have become more commonly used in control systems. A wireless field instrument comprises transceiver circuitry that is capable of wirelessly transmitting sensor information to the control system. A wireless network may comprise a plurality of wireless field instruments. For example, a wireless network may be used to wirelessly transmit sensor information from various wireless field instruments in the wireless network to a global controller of the control system.

Although the use of wireless field instruments is becoming more widespread, there are still many wired field instruments in use in various process facilities. It would be desirable to have an efficient system and method for providing a wired field instrument with the capability to operate as a wireless field instrument. It would also be desirable to have an efficient system and method for adapting a wired field instrument to operate as a wireless field instrument without having to make any changes to the internal wiring of the wired field instrument.

SUMMARY OF THE INVENTION

To address the above discussed deficiencies of the prior art, it is a primary object of the present invention to provide a system and method for adapting a loop powered wired field instrument for use in a wireless network without changing internal wiring of the loop powered wired field instrument.

One advantageous embodiment of the invention comprises a wired to wireless adapter apparatus that connects to the wired field instrument. The apparatus comprises power conversion circuitry that receives either external power or battery power and converts the received power to loop power for the wired field instrument. In this manner, the wired to wireless adapter apparatus provides loop power to the wired field instrument.

The wired to wireless adapter apparatus also receives and decodes either a digital signal or an analog signal from the wired field instrument. The wired to wireless adapter apparatus converts the decoded signal into a digital form for subsequent wireless transmission to a wireless network. It appears to the wireless network that receives the digital form of the transmitted wireless signal that the wired field instrument is a wireless field instrument. It appears to the wired field instrument that it is communicating with a wired control system.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designated like objects, and in which.

DETAILED DESCRIPTION

FIGS. 1 through 4 and the various embodiments used to describe the principles of the present invention in this patent document are by way of illustration only and should not be construed in any way to limit the scope of the invention. Those skilled in the art will understand that the principles of the invention may be implemented in any type of suitably arranged wired field instrument.

Figure 1:
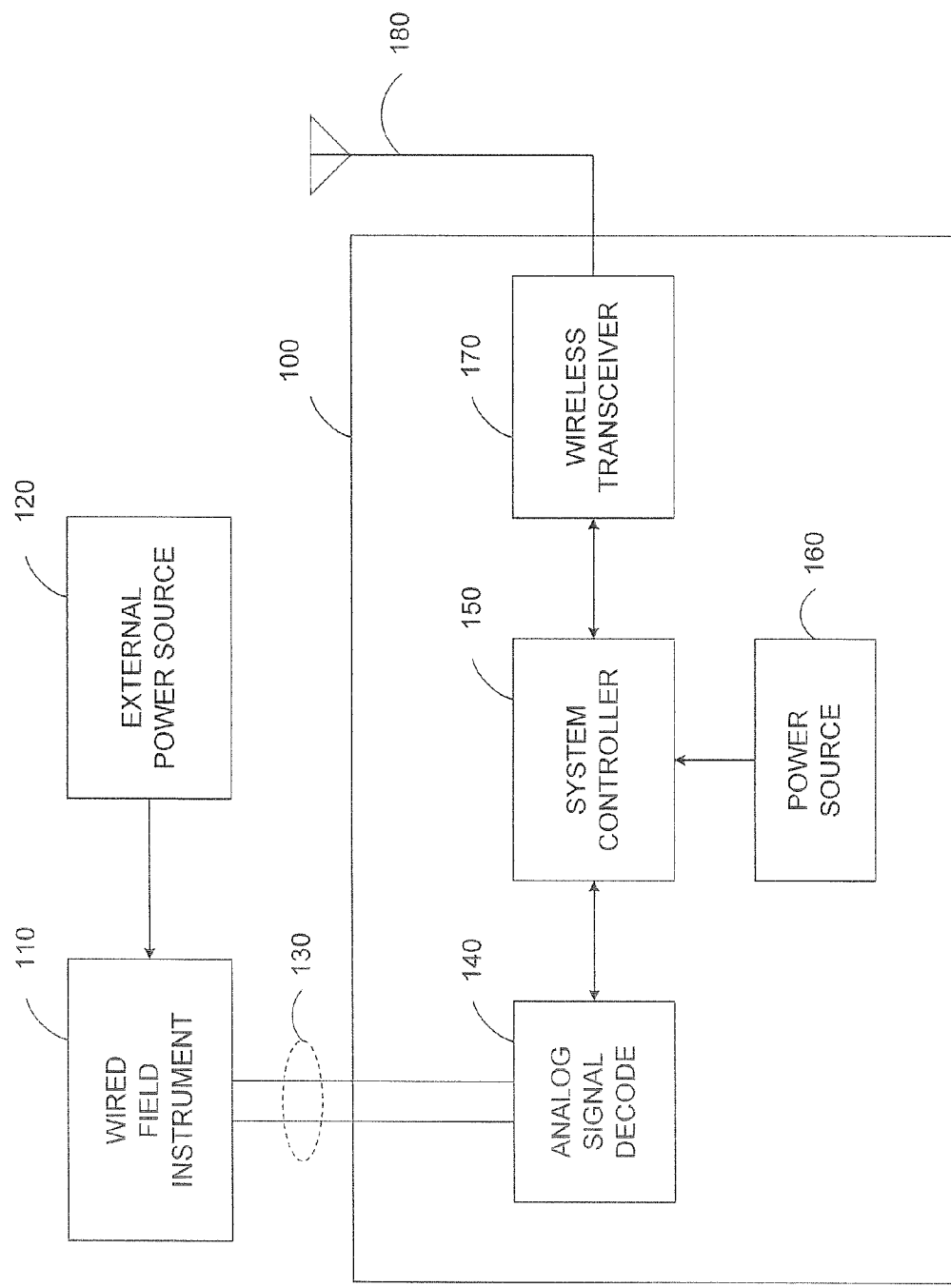
FIG. 1 illustrates a block diagram of a prior art device that decodes an analog signal from a prior art loop powered wired field instrument and wirelessly transmits a digital version of the decoded signal.

FIG. 1 illustrates a block diagram of a prior art apparatus 100 that decodes an analog signal from a prior art loop powered wired field instrument 110 and wirelessly transmits a digital version of the decoded signal. The prior art loop powered wired field instrument 110 receives power from an external power source 120.

The prior art loop powered wired field instrument 110 is connected to prior art device 100 through an industry standard wired interface 130. Wired interface 130 may comprise a two wire twisted pair current loop or 4-20 milliampere wiring. The prior art loop powered wired field instrument 110 has sensors (not shown) that obtain sensor readings or measurements of a desired characteristic (e.g., temperature, pressure, flow, sound, light). The prior art loop powered wired field instrument 110 provides an analog version of the sensor readings through the wired interface 130 to an analog signal decode unit 140 in the apparatus 100.

The analog signal decode unit 140 is connected to and is under the control of a system controller 150. The system controller 150 is powered by a power source 160. The power source 160 can receive power from a battery power source (not shown in FIG. 1) or can receive power from another external power source (not shown in FIG. 1).

The analog signal decode unit 140 decodes an analog signal that it receives from the loop powered wired field instrument 110. The analog signal decode unit 140 then converts the decoded analog signal into a digital version of the decoded signal. The analog signal decode unit 140 then sends the digital version of the decoded signal to the system controller 150.

The system controller 150 is connected to a wireless transceiver 170. The wireless transceiver 170 is connected to an external antenna 180. The system controller 150 provides the digital version of the decoded signal from the wired field instrument 110 to the wireless transceiver 170 for transmission over antenna 180.

Figure 2:
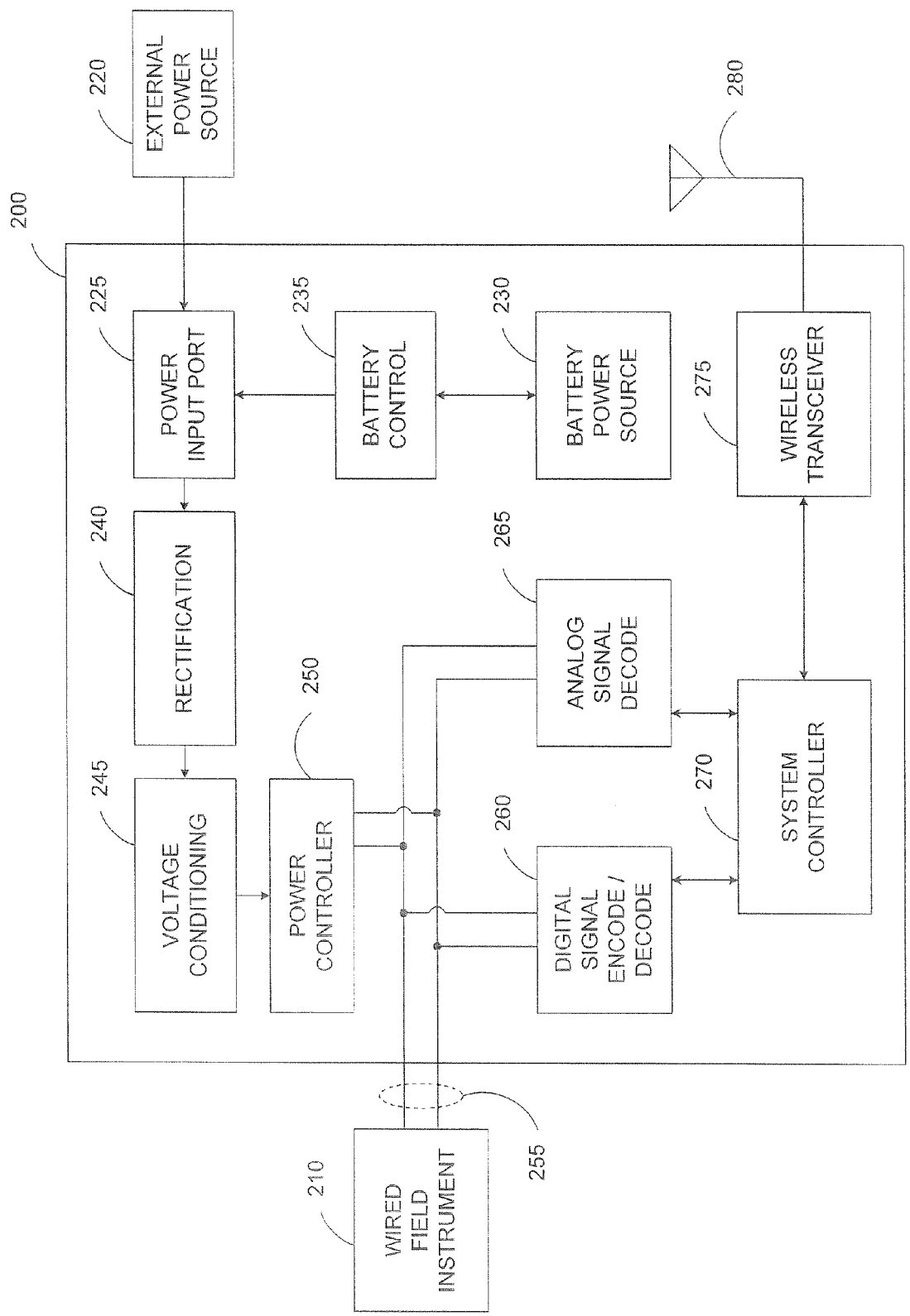
FIG. 2 illustrates a block diagram of an apparatus of the present invention that adapts a prior art loop powered wired field instrument for use in a wireless network.

FIG. 2 illustrates a block diagram of an apparatus 200 of the present invention that adapts a prior art loop powered wired field instrument 210 for use in a wireless network. In order to convert a prior art loop powered wired field instrument 210 for use in a wireless network, both power wiring and signal wiring need to be addressed. The apparatus 200 of the present invention provides both (1) circuitry for converting to a wireless signal format the wired signal from the loop powered wired field instrument 210 and (2) circuitry for providing power to the loop powered wired field instrument 210 through power conversion techniques.

The advantage of the apparatus 200 of the present invention is that it effectively converts any loop powered wired field instrument 210 into a wireless field instrument without having to make any changes to the internal wiring of the loop powered wired field instrument 210. For this reason, the apparatus 200 of the invention may also be referred to as a wired to wireless adapter apparatus 200.

In one advantageous embodiment of the invention the apparatus 200 receives power from an external power source 220. The external power source 220 provides power to a power input port 225. The apparatus 200 is also configured to operate on a battery power source 230 when power from an external power source 220 is not available. Power from the battery power source 230 is provided to a battery control unit 235. The battery control unit 235 provides the power to the power input port 225.

The power input port 225 provides the power (either from the external power source 220 or the battery control unit 235) to a rectification unit 240. The power signal is rectified in the rectification unit 240 and then provided to a voltage conditioning unit 245. The voltage conditioning unit 245 modifies the power signal as may be needed to convert the power to loop power for the loop powered wired field instrument 210.

The voltage conditioning unit 245 then provides the loop power to a power controller 250. The power controller 250 supplies the loop power to the loop powered wired field instrument 210 through an industry standard wired interface 255. Wired interface 255 may comprise a two wire twisted pair current loop or 4-20 milliampere wiring.

The power controller 250 also supplies the loop power to operate a system controller 270 and a wireless transceiver 275. The power supply line from the power controller 250 to the system controller 270 and to the wireless transceiver 275 is not shown in FIG. 2. The previously described circuitry of apparatus 200 is capable of generating loop power from the regular line power (external power source 220) that is available to the apparatus 200.

The apparatus 200 also comprises circuitry for receiving a wired signal from the wired field instrument 210 and converting the wired signal to an appropriate digital signal for transmission over the wireless transceiver 275. As previously mentioned, the loop powered wired field instrument 210 is connected to apparatus 200 through an industry standard wired interface 255. The loop powered wired field instrument 210 has sensors (not shown) that obtain sensor readings or measurements of a desired characteristic (e.g., temperature, pressure, flow, sound, light).

If the loop powered wired field instrument 210 is configured to generate a digital signal version of the sensor readings, then the loop powered wired field instrument 210 provides the digital signal through the wired interface 255 to a digital signal encode and decode unit 260 in the apparatus 200. If the loop powered wired field instrument 210 is configured to generate an analog signal version of the sensor readings, then the loop powered wired field instrument 210 provides the analog signal through the wired interface 255 to an analog signal decode unit 265 in the apparatus 200.

The digital signal encoder and decoder unit 260 and the analog signal decode unit 140 are both connected to and are under the control of the system controller 270. The decoder portion of the digital signal encoder and decoder unit 260 decodes a digital signal that is receives from the loop powered wired field instrument 210. The digital signal encoder and decoder unit 260 then sends the decoded digital signal to the system controller 270.

The digital signal encoder and decoder unit 260 also comprises an encoder portion. The system controller 270 is capable of sending digital control signals to the digital encoder and decoder unit 260. The digital signal encoder and decoder unit 260 is capable of (1) receiving digital control signals from the system controller 270 and (2) encoding the control signals and (3) providing the encoded control signals to the loop powered wired field instrument 210 through the wired interface 255.

The analog signal decode unit 265 is capable of receiving and decoding an analog signal from the loop powered wired field instrument 210. The analog signal decode unit 140 converts the decoded analog signal into a digital version of the decoded signal. The analog signal decode unit 265 then sends the digital version of the decoded signal to the system controller 270.

The system controller 270 is connected to wireless transceiver 275. The wireless transceiver 275 is connected to an external antenna 280. The system controller 270 provides the digital version of the decoded signal from the loop powered wired field instrument 210 (whether originally a digital signal or an analog signal) to the wireless transceiver 275 for transmission over antenna 280.

By using the apparatus 200 of the present invention, one can adapt a loop powered wired field instrument 210 for use in a wireless network. When the loop powered wired field instrument 210 is connected to the apparatus 200, the loop powered wired field instrument 210 operates as if it were communicating with a wired controller. On the other hand, when the loop powered wired field instrument 210 is connected to the apparatus 200, the wireless network operates as if it were communicating with a wireless field instrument. By using the apparatus 200 of the present invention, one can adapt a loop powered wired field instrument 210 that is designed to work only with a wired sensor network to work seamlessly within a wireless sensor network. That is, a wireless sensor network can seamlessly accommodate a loop powered wired sensor instrument 210 if the apparatus 200 of the invention connects the loop powered wired sensor instrument 210 to the wireless sensor network.

Figure 3:
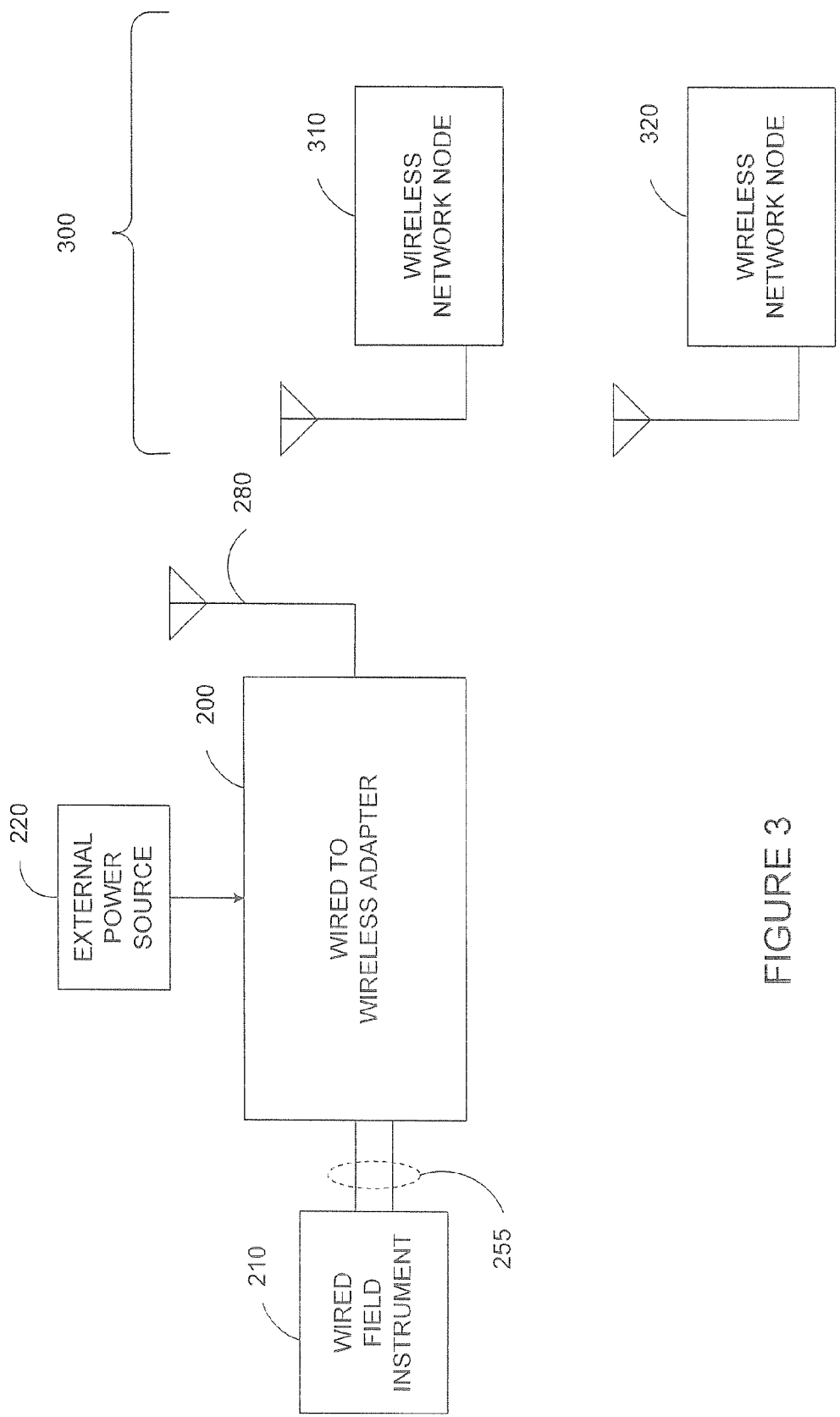
FIG. 3 illustrates a block diagram of a prior art loop powered wired field instrument that has been adapted for use in a wireless sensor network by a wired to wireless adapter apparatus of the present invention.

FIG. 3 illustrates a block diagram of a prior art loop powered wired field instrument 210 that has been adapted for use in a wireless sensor network 300 by a wired to wireless adapter apparatus 200 of the present invention. The exemplary wireless sensor network is designated with reference numeral 300. Wireless network node 310 and wireless network node 320 are two exemplary members of the wireless sensor network 300.

When the prior art loop powered wired field instrument 210 is connected to and operated in conjunction with the wired to wireless adapter apparatus 200 of the present invention as previously described, the combination appears to the wireless network nodes (310, 320) of the wireless sensor network 300 as a wireless field instrument.

Figure 4:
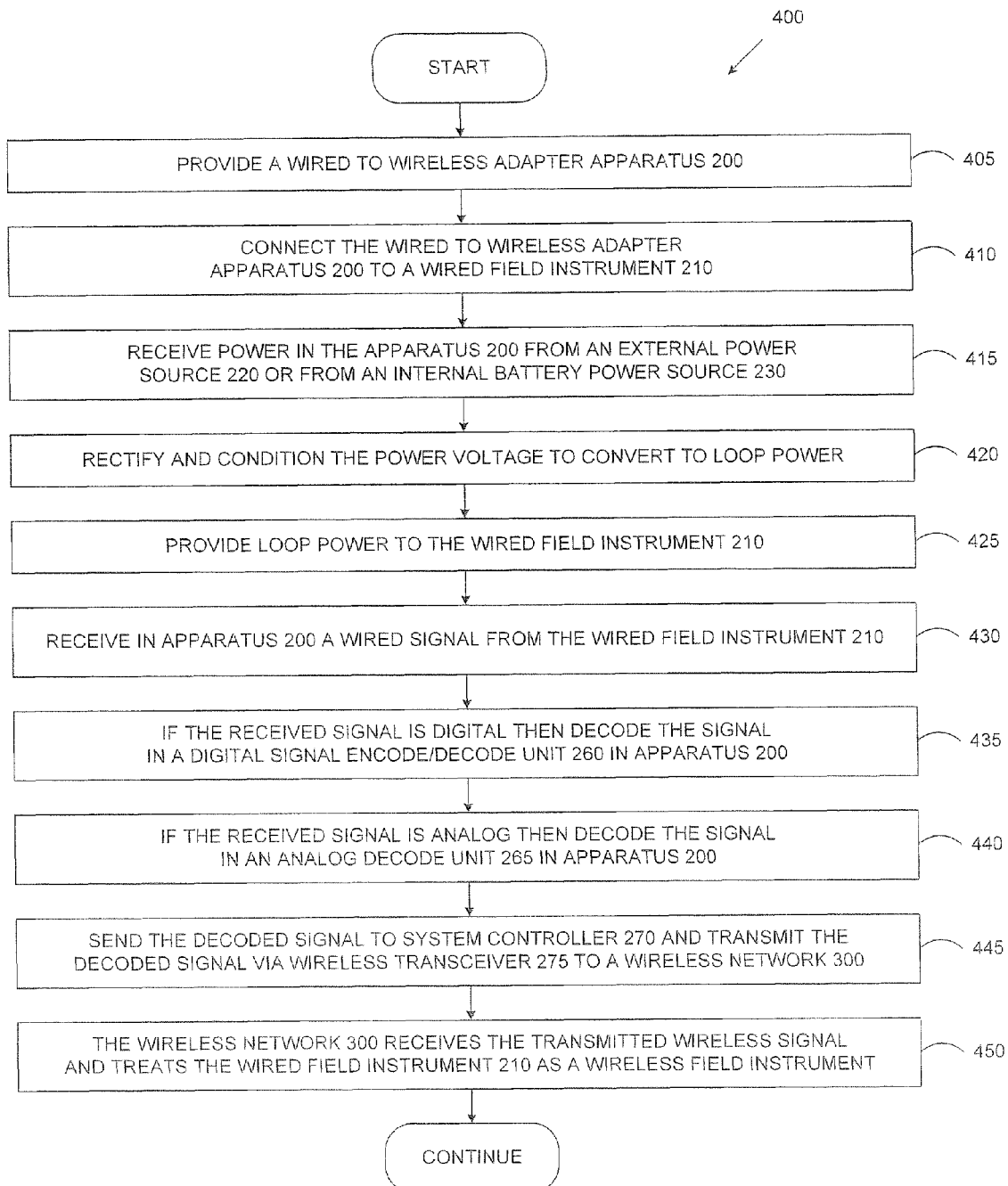
FIG. 4 illustrates a flow chart showing the steps of an advantageous embodiment of a method of the present invention.

FIG. 4 illustrates a flow chart 400 showing the steps of an advantageous embodiment of a method of the present invention. The method shown in flow chart 400 adapts a prior art loop powered wired field instrument 210 to work in a wireless sensor network 300 in accordance with the principles of the present invention. In the first step a wired to wireless adapter apparatus 200 of the invention is provided (step 405). The wired to wireless adapter apparatus 200 is then connected to a wired field instrument (step 410).

The wired to wireless adapter apparatus 200 receives power from an external power source 220 or from an internal battery power source 230 (step 415). Then the power voltage is rectified and conditioned in the apparatus 200 to convert to loop power (step 420). The loop power is then provided to the wired field instrument 210 (step 425).

The apparatus 200 receives a wired signal from the wired field instrument 210 (step 430). If the received wired signal is a digital signal, then the digital wired signal is decoded in a digital signal encode/decode unit 260 in apparatus 200 (step 435). If the received wired signal is an analog signal, then the analog wired signal is decoded in an analog signal decode unit 265 in apparatus 200 (step 440).

The decoded signal is then sent to a system controller 270 and transmitted via a wireless transceiver 275 to a wireless network 300 (step 445). The wireless network 300 receives the transmitted wireless signal and treats the wired field instrument 210 as a wireless field instrument (step 450).

It may be advantageous to set forth definitions of certain words and phrases used throughout this patent document. The terms "application," "program," and "routine" refer to one or more computer programs, sets of instructions, procedures, functions, objects, classes, instances, or related data adapted for implementation in a suitable computer language. The term "couple" and its derivatives refer to any direct or indirect communication between two or more elements, whether or not those elements are in physical contact with one another.

The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. An apparatus comprising:
    wireless transceiver circuitry configured to wirelessly transmit a signal received from a wired field instrument in a process control system, the wired field instrument configured to measure a characteristic of at least one industrial process in the process control system; and
    power conversion circuitry configured to receive line power from a power source and convert the received line power to loop power for the wired field instrument and the wireless transceiver circuitry;
    wherein the wireless transceiver circuitry and the power conversion circuitry are configured to adapt the wired field instrument to operate as a wireless field instrument without changing internal wiring of the wired field instrument.

2. The apparatus as set forth in claim 1, wherein the apparatus further comprises:
    signal control circuitry configured to receive the signal from the wired field instrument and convert the received signal to a digital form for wireless transmission by the wireless transceiver circuitry.

3. The apparatus as set forth in claim 2, wherein the signal control circuitry comprises:
    a digital signal encode/decode unit that is configured to receive and decode a digital signal from the wired field instrument; and
    a system controller that is configured to convert the decoded digital signal to the digital form for wireless transmission.

4. The apparatus as set forth in claim 3, wherein the system controller is configured to send digital control signals to the wired field instrument through the digital signal encode/decode unit.

5. The apparatus as set forth in claim 2, wherein the signal control circuitry comprises:
    an analog signal decode unit that is configured to receive and decode an analog signal from the wired field instrument; and
    a system controller that is configured to convert the decoded analog signal to the digital form for wireless transmission.

6. The apparatus as set forth in claim 1, wherein the power source is at least one of: an external power source and a battery power source.

7. The apparatus as set forth in claim 1, wherein the power conversion circuitry comprises a power input port, a rectification unit, a voltage conditioning unit, and a power controller.

8. The apparatus as set forth in claim 7, wherein the power controller is connected to the wired field instrument through a conventional wired interface and is configured to provide loop power to the wired field instrument through the conventional wired interface.

9. The apparatus as set forth in claim 1, wherein the power conversion circuitry is configured to provide the loop power to the wired field instrument through a wired interface comprising 4-20 milliampere wiring.

10. A wireless network comprising a plurality of wireless network nodes in which at least one wireless network node comprises:

a wired field instrument in a process control system, the wired field instrument configured to measure a characteristic of at least one industrial process in the process control system; and an apparatus connected to the wired field instrument and configured to adapt the wired field instrument to operate as a wireless field instrument without changing internal wiring of the wired field instrument, the apparatus comprising:

wireless transceiver circuitry configured to wirelessly transmit a signal received from the wired field instrument; and power conversion circuitry configured to receive line power from a power source and convert the received line power to loop power for the wired field instrument and the wireless transceiver circuitry.

11. The wireless network as set forth in claim 10, wherein the apparatus further comprises:

signal control circuitry configured to receive the signal from the wired field instrument and convert the received signal to a digital form for wireless transmission by the wireless transceiver circuitry.

12. The wireless network as set forth in claim 11, wherein the signal control circuitry of the apparatus comprises:

a digital signal encode/decode unit that is configured to receive and decode a digital signal from the wired field instrument; and a system controller that is configured to convert the decoded digital signal to the digital form for wireless transmission.

13. The wireless network as set forth in claim 12, wherein the system controller of the apparatus is configured to send digital control signals to the wired field instrument through the digital signal encode/decode unit.

14. The wireless network as set forth in claim 11, wherein the signal control circuitry of the apparatus comprises:

an analog signal decode unit that is configured to receive and decode an analog signal from the wired field instrument; and a system controller that is configured to convert the decoded analog signal to the digital form for wireless transmission.

15. The wireless network as set forth in claim 10, wherein the power source of the apparatus is at least one of: an external power source and a battery power source.

16. The wireless network as set forth in claim 10, wherein the power conversion circuitry of the apparatus comprises a power input port, a rectification unit, a voltage compensating unit, and a power controller.

17. The wireless network as set forth in claim 16, wherein the power controller of the apparatus is connected to the wired field instrument through a conventional wired interface and is configured to provide loop power to the wired field instrument through the conventional wired interface.

18. The wireless network as set forth in claim 10, wherein the power conversion circuitry is configured to provide the loop power to the wired field instrument through a wired interface comprising 4-20 milliampere wiring.

19. A method comprising the steps of:

connecting a wired-to-wireless adapter apparatus to a wired field instrument in a process control system through a conventional wired interface, the wired field instrument configured to measure a characteristic of at least one industrial process in the process control system;

receiving line power in the wired-to-wireless adapter apparatus;

converting the received line power to loop power;

providing the loop power to the wired field instrument through the conventional wired interface; and providing the loop power to wireless transceiver circuitry in the wired-to-wireless adapter;

wherein the wired-to-wireless adapter adapt the wired field instrument to operate as a wireless field instrument without changing internal wiring of the wired field instrument.

20. The method as set forth in claim 19, further comprising the steps of:

receiving in the wired-to-wireless adapter apparatus a wired signal from the wired field instrument;

decoding the received wired signal;

converting the decoded signal to a digital form for wireless transmission; and wirelessly transmitting the digital form of the decoded signal to a wireless network.

* * * * *